US009955434B1

(12) United States Patent
Rajendran et al.

(10) Patent No.: US 9,955,434 B1
(45) Date of Patent: Apr. 24, 2018

(54) METHOD AND SYSTEM FOR CONTROLLING A TRANSMIT RANGE OF A WIRELESS TRANSMITTER

(71) Applicant: Wipro Limited, Bangalore (IN)

(72) Inventors: Surendran Rajendran, Chennai (IN); Ramachandra Budihal, Bangalore (IN); Venkata Prabhakar Tamma, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/469,080

(22) Filed: Mar. 24, 2017

(30) Foreign Application Priority Data

Mar. 21, 2017 (IN) .............................. 201741009870

(51) Int. Cl.
*H04W 84/18* (2009.01)
*H04W 52/24* (2009.01)
*H04B 17/318* (2015.01)
*H04B 17/336* (2015.01)

(52) U.S. Cl.
CPC ........ *H04W 52/245* (2013.01); *H04B 17/318* (2015.01); *H04B 17/336* (2015.01)

(58) Field of Classification Search
CPC ..... H04W 84/18; H04W 4/023; H04W 4/021; H04W 4/025; H04W 52/0245; H04W 8/005
USPC ................. 455/522, 69, 68, 67.11, 500, 517, 455/456.1–457, 41.1–41.3, 423–425, 455/422.1, 403, 446, 550.1, 445, 426.1, 455/426.2, 39; 340/539.1, 447, 686.6
See application file for complete search history.

(56) References Cited

U.S. PATENT DOCUMENTS

| 8,532,672 | B2 | 9/2013 | Kruglick |
| 8,565,787 | B2 | 10/2013 | Bevan et al. |
| 2018/0007653 | A1* | 1/2018 | O'Shea ................. H04W 64/00 |

OTHER PUBLICATIONS

Prakar, et al., "Likelihood Criteria Based Co-channel Primary Transmitters Localization Algorithm for Cognitive Radio Networks", IEEE 2013 Tencon-Spring.

* cited by examiner

*Primary Examiner* — Keith Ferguson
(74) *Attorney, Agent, or Firm* — LeClairRyan PLLC

(57) ABSTRACT

A technique is provided for controlling a transmit range of a wireless transmitter. The technique includes retrieving Received Signal Strength Indicator (RSSI) values measured by one or more sensors, corresponding to the plurality of wireless transmitters distributed in a region in which the sensors are located. A plurality of parameters associated with the wireless transmitter to be placed within the region are received. The plurality of parameters includes a minimum range of transmission of the wireless transmitter and a preferred position in the region. A plurality of clusters are generated based on the retrieved RSSI values and the minimum range. Further, one or more positions for placing the wireless transmitter within a cluster from the plurality of clusters, and a maximum range of transmission at each of the one or more positions, are determined. The maximum range is determined by controlling a range of transmission of the wireless transmitter.

20 Claims, 5 Drawing Sheets

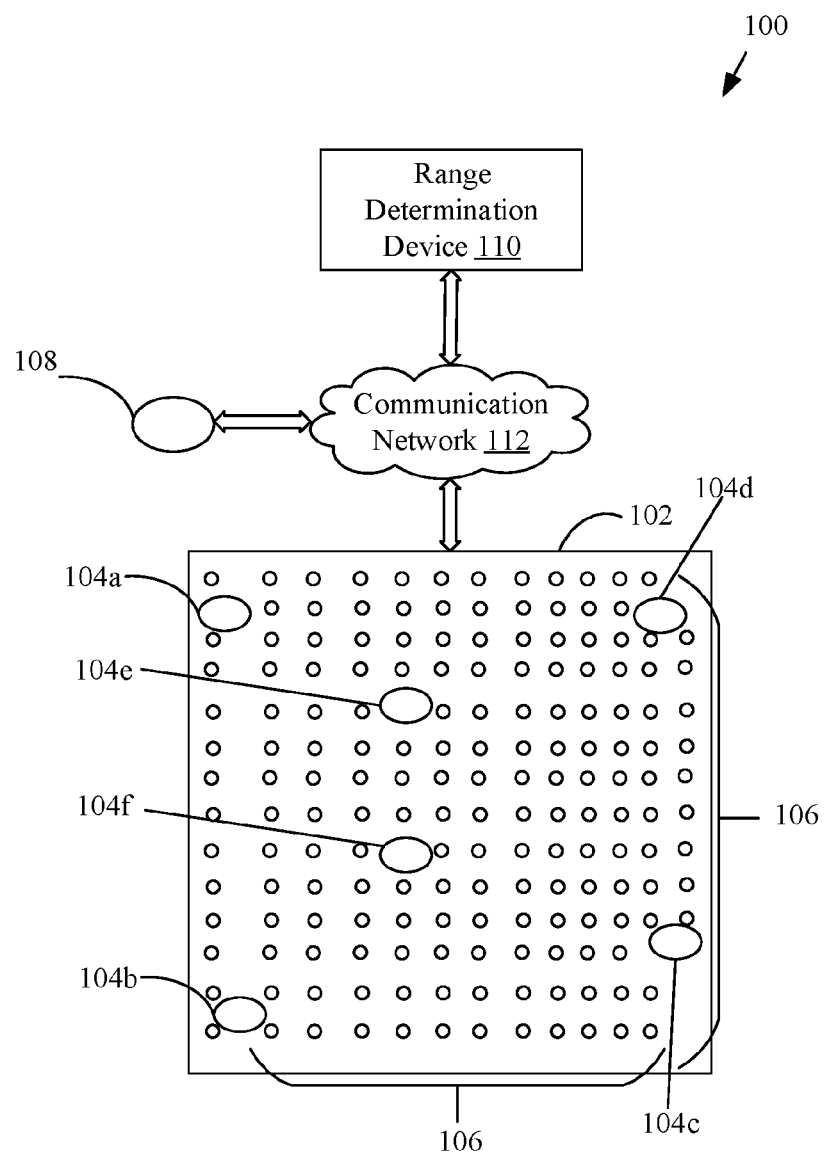
FIG. 1: Network Environment 100

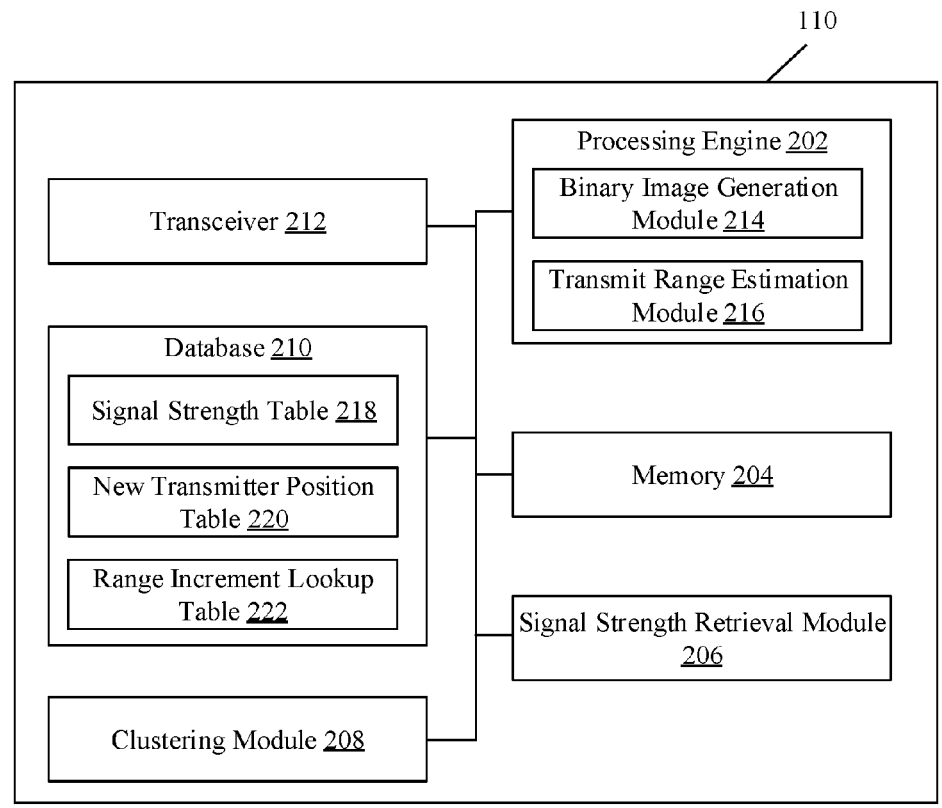
FIG. 2: Range Determination Device 110

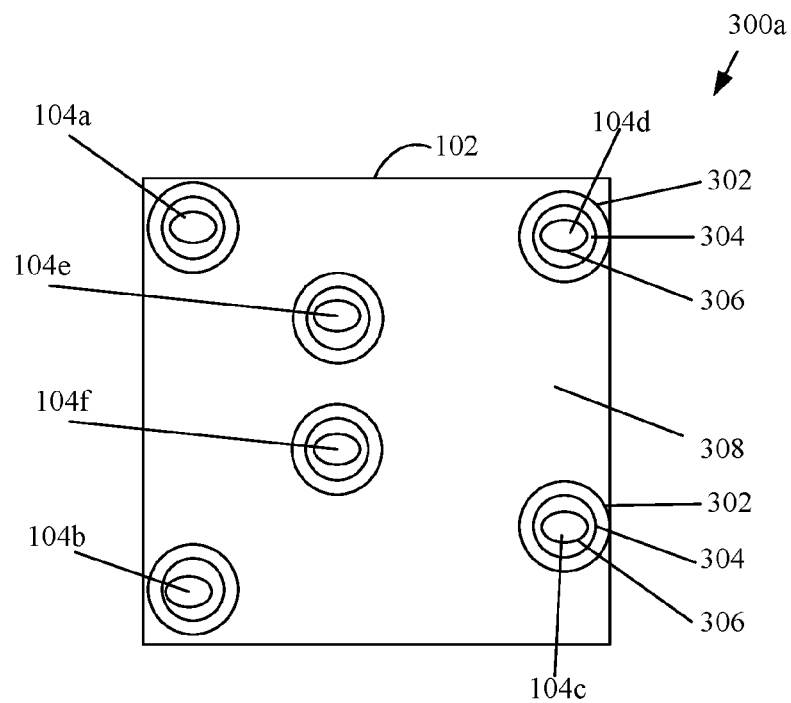
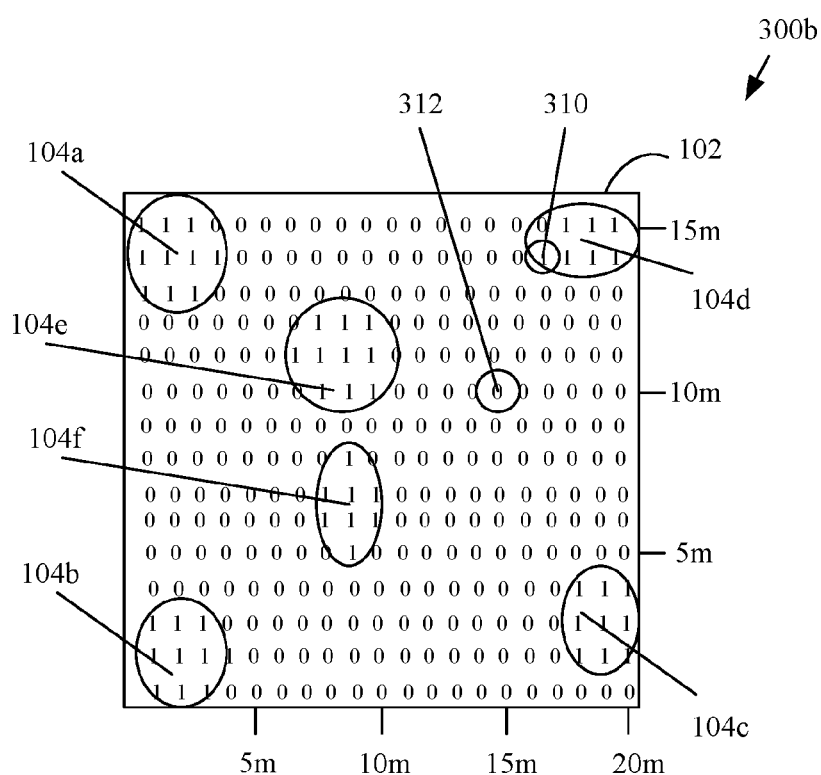
FIG. 3: Exemplary control of transmit range of a wireless transmitter

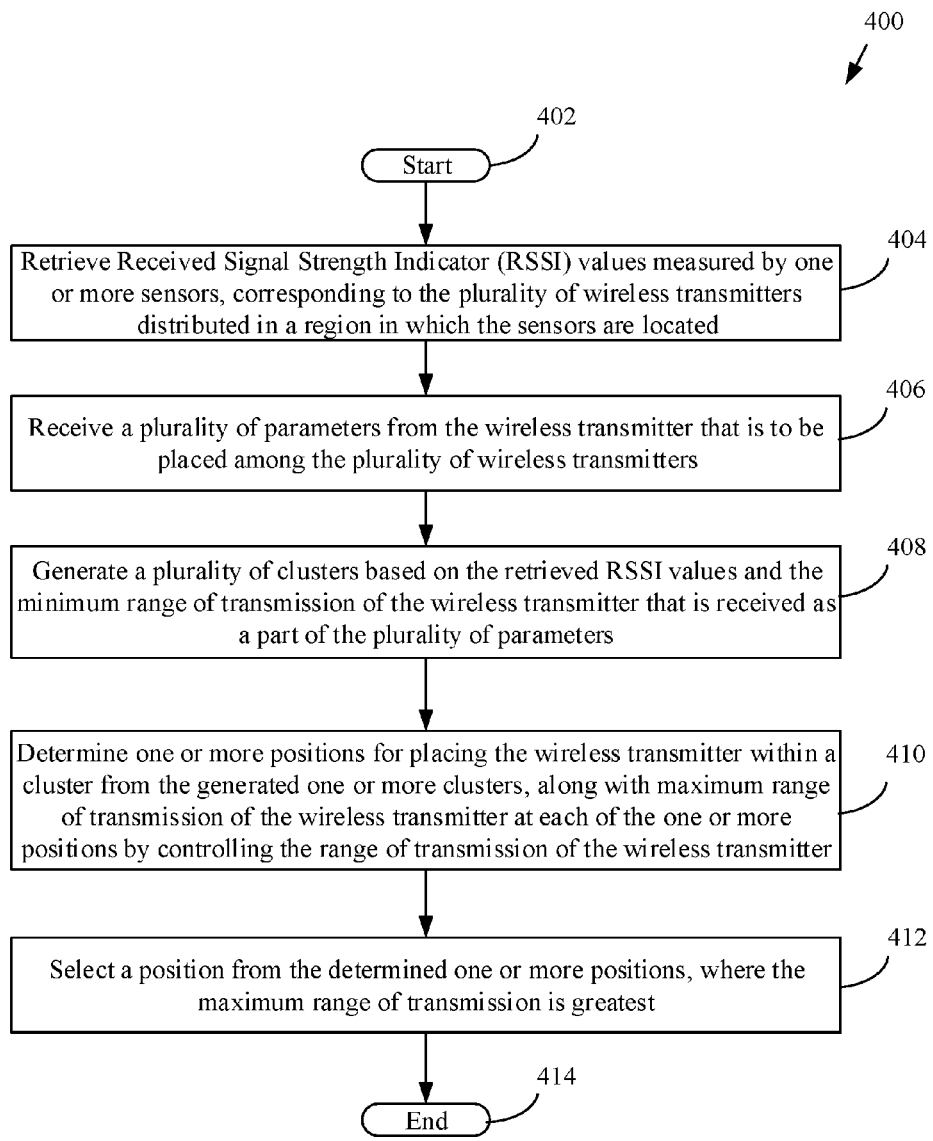
FIG. 4: Method 400 for controlling a transmit range of a wireless transmitter

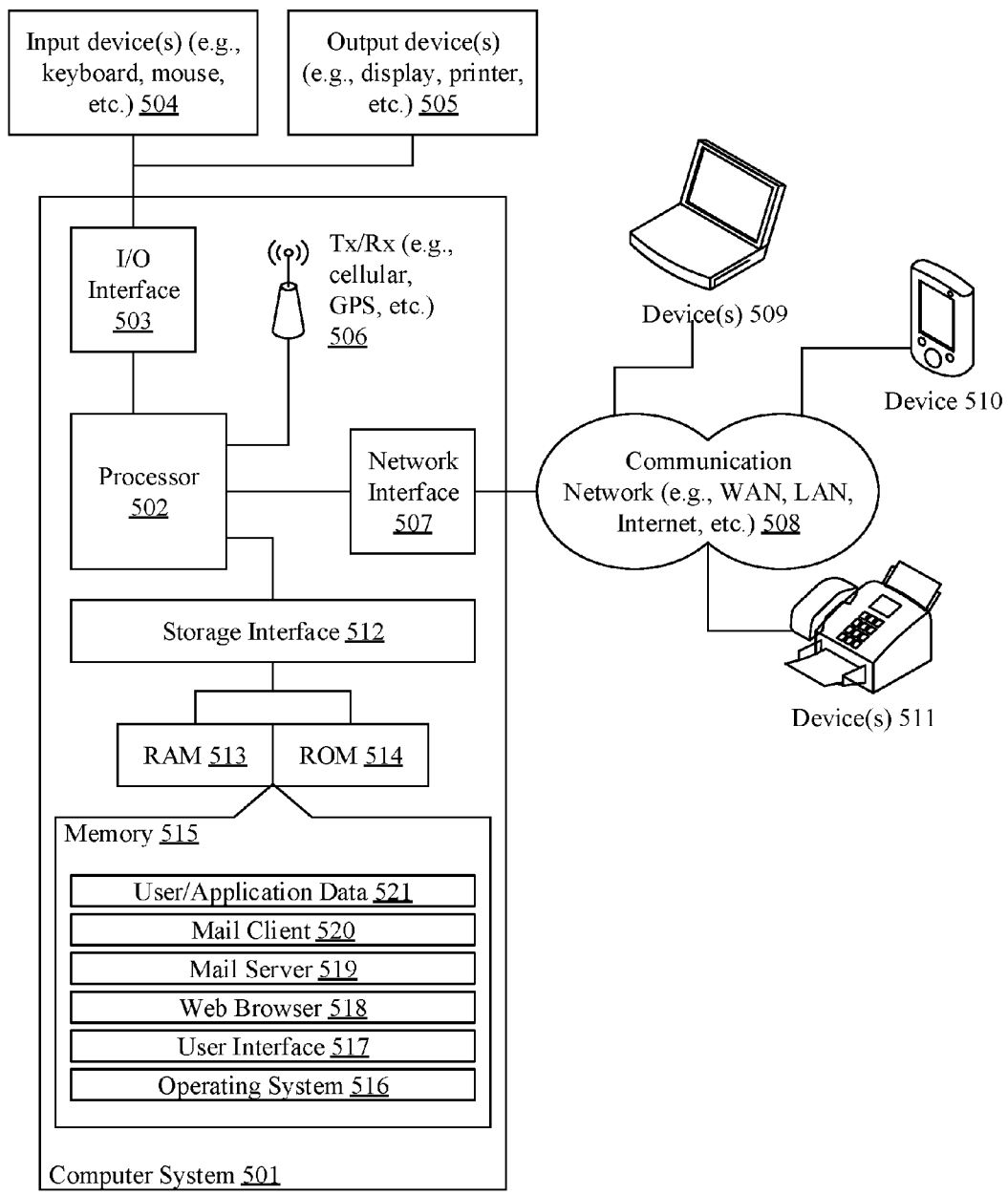
FIG. 5: Example Computer System

METHOD AND SYSTEM FOR CONTROLLING A TRANSMIT RANGE OF A WIRELESS TRANSMITTER

This application claims the benefit of Indian Patent Application Serial No. 201741009870, filed Mar. 21, 2017, which is hereby incorporated by reference in its entirety.

TECHNICAL FIELD

This disclosure relates generally to controlling a transmit range of a wireless transmitter, and more particularly to system and method controlling a transmit range of a wireless transmitter to be placed among a plurality of wireless transmitters.

BACKGROUND

In large indoor spaces, such as factory floors (such as aircraft factory floors) or warehouses, multiple wireless transmitters are distributed spatially. All the wireless transmitters have an individual transmission power and frequency of operation. However, due to limited availability of frequency spectrum it becomes imperative to reuse the frequencies used for transmissions by the wireless transmitters. Such a reuse enables full utilization of the available frequency spectrum for communication. In order to enable the reuse of the frequency spectrum, an estimation of the positions of the wireless transmitters across the indoor space needs to be made. This is because placing the wireless transmitters using the same frequency spectrum in the proximity of each other may lead to interference and subsequent loss of information transmitted by the wireless transmitters.

In the aforementioned scenario, placing a new wireless transmitter, utilizing the same frequency in the vicinity of already placed wireless transmitters, may result in interference of the signal transmitted by both the wireless transmitters. In such a scenario, it becomes imperative to know the exact positions of the already existing wireless transmitters and the knowledge of an interference that may be caused by the new transmitter when placed in the vicinity of an already placed wireless transmitter.

It is therefore desirable to provide a mechanism to utilize the localization information of the positions of the wireless transmitters to determine a position at which the new wireless transmitter can be placed. It may be further desirable to utilize the localization information of the positions of the wireless transmitters to determine a power at which the new wireless transmitter transmits so that the interference between the new wireless transmitter and the already existing wireless transmitters may be minimized.

SUMMARY

In one embodiment, a method of controlling a transmit range of a wireless transmitter to be placed among a plurality of wireless transmitters, is disclosed. In one example, the method comprises retrieving, by a range determination device, Received Signal Strength Indicator (RSSI) values measured by one or more sensors, corresponding to the plurality of wireless transmitters spatially distributed in a region in which the sensors are located. The method further comprises receiving, by the range determination device, at least a plurality of parameters associated with the wireless transmitter to be placed within the region. The plurality of parameters comprise at least a minimum range of transmission of the wireless transmitter and a preferred position in the region where the wireless transmitter is to be placed. The method further comprises generating, by the range determination device, a plurality of clusters based on at least the retrieved RSSI values and minimum range of transmission of the wireless transmitter. The method further comprises determining, by the range determination device, one or more positions for placing the wireless transmitter within a cluster from the plurality of clusters, and a maximum range of transmission at each of the one or more positions. The maximum range may be determined based on a control of a range of transmission of the wireless transmitter.

In another embodiment, a system for controlling a transmit range of a wireless transmitter to be placed among a plurality of wireless transmitters, is disclosed. The system comprises a processor and a memory communicatively coupled to the processor. The memory stores processor-executable instructions, which, on execution, cause the processor to retrieve Received Signal Strength Indicator (RSSI) values measured by one or more sensors, corresponding to the plurality of wireless transmitters spatially distributed in a region in which the sensors are located. The processor-executable instructions, on execution, further cause the processor to receive at least a plurality of parameters associated with the wireless transmitter to be placed within the region. The plurality of parameters comprise at least a minimum range of transmission of the wireless transmitter and a preferred position in the region where the wireless transmitter is to be placed. The processor-executable instructions, on execution, further cause the processor to generate a plurality of clusters based on at least the retrieved RSSI values and the minimum range of transmission of the wireless transmitter. The processor-executable instructions, on execution, further cause the processor to determine one or more positions for placing the wireless transmitter within a cluster from the plurality of clusters, and a maximum range of transmission at each of the one or more positions. The maximum range may be determined based on a control of a range of transmission of the wireless transmitter.

In another embodiment, a non-transitory computer-readable medium storing computer-executable instructions for controlling a transmit range of a wireless transmitter to be placed among a plurality of wireless transmitters, is disclosed. In one example, the stored instructions, when executed by a processor, cause the processor to perform operations that comprise retrieving Received Signal Strength Indicator (RSSI) values measured by one or more sensors, corresponding to the plurality of wireless transmitters spatially distributed in a region in which the sensors are located. The operations further comprise receiving at least a plurality of parameters associated with the wireless transmitter to be placed within the region. The plurality of parameters comprise at least a minimum range of transmission of the wireless transmitter and a preferred position in the region where the wireless transmitter is to be placed. The operations further comprise generating a plurality of clusters based on at least the retrieved RSSI values and the minimum range of transmission of the wireless transmitter. The operations further comprise determining one or more positions for placing the wireless transmitter within a cluster from the plurality of clusters, and a maximum range of transmission at each of the one or more positions. The maximum range may be determined based on a control of a range of transmission of the wireless transmitter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram of an exemplary network environment for controlling a transmit range of a wireless transmitter, in accordance with some embodiments of the present disclosure.

FIG. 2 is a block diagram of exemplary system for controlling a transmit range of a wireless transmitter, in accordance with some embodiments of the present disclosure.

FIG. 3 illustrates an exemplary versions of a processed indoor space for controlling a transmit range of a wireless transmitter, in accordance with some embodiments of the present disclosure.

FIG. 4 is a flow diagram of a detailed exemplary process for controlling a transmit range of a wireless transmitter, in accordance with some embodiments of the present disclosure.

FIG. 5 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to FIG. 1, an exemplary network environment 100 for controlling a transmit range of a wireless transmitter is illustrated, in accordance with some embodiments of the present disclosure. As will be described in greater detail in conjunction with FIG. 2, the network environment 100 displays a region, such as an indoor space 102, which includes a plurality of wireless transmitter 104a to 104b. The indoor space 102 further includes a one or more sensors in the form of one or more sensors 106 that may be distributed uniformly in a grid pattern. In an implementation, the indoor space 102 may correspond to a Cartesian coordinate space wherein each of the plurality of wireless transmitter 104a to 104b, and each sensor of the one or more sensors 106, may be assigned a Cartesian coordinate. A person of ordinary skill in the art will appreciate that the distribution of the one or more sensors 106 may be uniform in the aforementioned indoor space 102. However, in alternate embodiments, the distribution of the one or more sensors 106 in the indoor space 102 may be non-uniform. The network environment 100 may further include one or more wireless transmitters, such as wireless transmitter 108 (new wireless transmitter 108 hereinafter) that is to be placed in the indoor space 102.

The network environment 100 may further include a range determination device 110 that may be communicatively coupled with each sensor of the one or more sensors 106, via the communication network 112. In an implementation, the range determination device 110 may be placed within the confines of the indoor space 102. In an alternate implementation, the range determination device 110 may be placed at a location that is remote with respect to the indoor space 102.

In an implementation, the network environment 100 may further include a network of computing devices (e.g., a computer, a server, a digital device, a router, a modem, a bridge, a switch, etc.) for sending or receiving various data. Each of the computing devices may further include one or more processors and a computer-readable medium (e.g., a memory). The computer-readable storage medium stores instructions that, when executed by the one or more processors, cause the one or more processors to perform localization of the plurality of wireless transmitters 104a to 104f, in accordance with aspects of the present disclosure. The computer-readable storage medium may also store various data (e.g., optimal network path, optimal packet size, data packets, current packet size of a node, etc.) that may be captured, processed, and/or required by the network environment 100.

In operation, a sensor from the one or more sensors 106 may measure the Received Signal Strength (RSSI) values corresponding one or more wireless transmitters from the plurality of wireless transmitters 104a to 104f. The one or more sensors 106 may communicate the measured RSSI values to a database (not shown), via the communication network 112. The aforementioned database may be configured to store the reported RSSI values corresponding to the each of the one or more sensors 106, along with the location (Cartesian coordinates) of each of the one or more sensors 106.

In an embodiment, the communication network 112 may include a medium through which the one or more sensors 106 and the range determination device 110 present in the network environment 100 may communicate with each other. Examples of the communication network 112 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In an embodiment, the range determination device 110 may retrieve Received Signal Strength Indicator (RSSI) values measured by the one or more sensors 106, corresponding to the plurality of wireless transmitters 104a to 104f, distributed in the indoor space 102. In an embodiment, the RSSI values may be retrieved from the database where the RS SI values measured by the one or more sensors 106 are stored. In an embodiment, such a database may be placed remotely with respect to the range determination device 110. In another embodiment, such a database may be integrated with the range determination device 110. In an embodiment, the aforementioned database may be implemented by use of various database technologies known in the art. Examples of the multimedia database 106 may include, but are not limited to, Microsoft® SQL Server, Oracle®, IBM DB2®, Microsoft Access®, PostgreSQL®, MySQL®, and/or SQLite®. In an embodiment, the range determination device 110 may be communicatively coupled with the multimedia database 106, based on one or more protocols. Examples of such one or more protocols may include, but are not limited to, Open Database Connectivity (ODBC)® protocol and Java Database Connectivity (JDBC)® protocol.

The range determination device 110 may further receive a plurality of parameters associated with the new wireless transmitter 108. In an embodiment, the plurality of parameters may include at least a minimum range of transmission of the new wireless transmitter 108 and a preferred position where the new wireless transmitter 108 is to be placed, within the indoor space 102.

The range determination device 110 may further generate a plurality of clusters based on the retrieved RSSI values and the received minimum range of transmission of the new wireless transmitter 108. In an embodiment, the generation of the plurality of clusters includes creation of a data structure having RSSI values measured by each of the one or more sensors 106. Each element of the data structure corresponds to a location (Cartesian coordinates) of a sensor from the one or more sensors 106. The generation of the plurality of clusters may further include determination of a plurality of centroids of the data structure having the RSSI values. In an embodiment, the plurality of centroids may be determined based on a random selection of the RSSI values from the data structure. The determination of the plurality of clusters may be based on K-means clustering algorithm and/or K-means++ clustering algorithm. Notwithstanding, the disclosure may not be so limited, and the generation of the plurality of clusters may be based on one or more other clustering algorithms known in the art, without limiting the scope of the disclosure.

In an embodiment, the count of the generated clusters may be based on a maximum range of transmission of the plurality of wireless transmitters 104a to 104f, a recommended minimum distance between the one or more sensors located in the indoor space 102. The count of the generated clusters may be further based on a minimum range of transmission of the new wireless transmitter 108. A person of ordinary skill in the art will appreciate that a difference in the maximum range of transmission of the plurality of wireless transmitters 104a to 104f is less than a predefined threshold. In other words, the maximum range of transmission of the plurality of wireless transmitters 104a to 104f is comparable.

The range determination device 110 may further determine one or more positions for placing the new wireless transmitter 108 within a cluster from the plurality of clusters. The range determination device may be configured to store the determined one or more positons in a transmitter table database. The range determination device 110 may further determine a maximum range of transmission at each of the aforementioned one or more positions.

In an embodiment, the determined one or more positions of the new wireless transmitter 108 may be different from the preferred position. For such a scenario to occur the determined maximum range of transmission the new wireless transmitter 108 at the preferred position should be less than the minimum range of transmission the new wireless transmitter 108.

In an embodiment, the maximum range may be determined based on a controlling of a range of transmission of the wireless transmitter. In an embodiment, the aforementioned controlling may be based on incrementing of the minimum range of transmission of the new wireless transmitter 108 by a predefined value. Further, incrementing may be performed until the interference between the new wireless transmitter 108 and a wireless transmitter from the plurality of wireless transmitters 104a to 104f is less than a predefined interference threshold. This may be done to ensure that the operation of a wireless transmitter from the plurality of wireless transmitters 104a to 104f is not affected due to the interference caused by operation of the new wireless transmitter 108, when the new wireless transmitter 108 is placed in the vicinity of the plurality of wireless transmitters 104a to 104f. A person of ordinary skill in the art will further appreciate that based on the incremented range of transmission the interference between the wireless transmitter and a wireless transmitter from the plurality of wireless transmitters is less than a predefined interference threshold.

In an embodiment, the range determination device 110 may select a position from the determined one or more positions. The determination may be performed in such a way that the maximum range of transmission for the selected position is higher than the each of the determined maximum range of transmission corresponding to remaining positions from the determined one or more positions. A person of ordinary skill in the art will appreciate that the determined maximum range of transmission of the wireless transmitter is greater than or equal to the minimum range of transmission of the wireless transmitter.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network 112 by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

FIG. 2 is a block diagram of exemplary system for controlling a transmit range of a wireless transmitter to be placed among a plurality of wireless transmitters, in accordance with some embodiments of the present disclosure. FIG. 2 is explained in conjunction with elements from FIG. 1. With reference to FIG. 2, there is shown the range determination device 110. The range determination device 110 may include a processing engine 202, a memory 204, a signal strength retrieval module 206, a clustering module 208, a database 210, and/or a transceiver 212. The processing engine 202 may be communicatively coupled to the memory 204, the signal strength retrieval module 206, the clustering module 208, the database 210, and/or the transceiver 212. In an embodiment, the range determination device 110 may be communicatively coupled to the one or more sensors 106, through the communication network 112, via the transceiver 214.

In an embodiment, the processing engine 202 may include a binary image generation module 214 and/or a transmit range estimation module 216. Further, the database 210 may include a signal strength table 218, a transmitter position table 220, and/or a range increment lookup table 222. As discussed in FIG. 1, the database 210 may be integrated within the range determination device 110, or may be a remote entity, communicatively coupled to the range determination device 110, via the communication network 112.

A person of ordinary skill in the art will appreciate that in an embodiment, the modules shown in FIG. 2 may comprise one or more set of instructions, and the modules in themselves may be stored in the memory 204. Each of the set of instructions of the stored modules may be executed by the processing engine 202, based on the various events explained in the subsequent disclosure.

In operation, the Received Signal Strength (RSSI) values corresponding to one or more wireless transmitters from the plurality of wireless transmitters 104a to 104f, may be stored in the signal strength table 218 of the database 210. Upon generation of request for placing a wireless transmitter (such as the new wireless transmitter 108) in the vicinity of the plurality of wireless transmitters 104a to 104f, the processing engine 202 may be configured to instruct the signal strength retrieval module 206 to retrieve the stored RSSI values from the signal strength table 218. The processing engine 202 may include suitable logic, circuitry, interfaces, and/or code that may be configured to execute a set of instructions stored in the memory 204. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

In an embodiment, the retrieved RSSI values may correspond to a location (Cartesian coordinates with respect to the indoor space 102) of a sensor of the one or more sensors 106. The signal strength retrieval module 206 may be configured to organize the retrieved values in a data structure, such as a Signal-Strength-Matrix. Within the Signal-Strength-Matrix, each element may correspond to coordinates of a sensor of the one or more sensors 106. For example, in an instance when the indoor space 102 includes nine sensors with Cartesian coordinates "{(x, y); x=0 to 2; y=0 to 2}" with measured signal strengths of "S1, S2 . . . S9" respectively, then the Signal-Strength-Matrix would be denoted by the matrix (1):

$$\begin{matrix} S7 & S8 & S9 \\ S4 & S5 & S6 \\ S1 & S2 & S3 \end{matrix} \tag{1}$$

In an embodiment, the signal strength retrieval module 206 may be configured to communicate the Signal-Strength-Matrix to the clustering module 208.

The clustering module 208 may be configured to generate a plurality of clusters using the received Signal-Strength-Matrix. The clusters in the plurality of clusters "K" are mutually exclusive sets into which the signal strength values are partitioned.

In an embodiment, the range determination device 110 may be further configured to receive a plurality of parameters associated with the new wireless transmitter 108. The plurality of parameters may include a minimum range of transmission of the new wireless transmitter 108 along with a preferred position in the indoor space 102, where the new wireless transmitter 108 is to be placed. In an embodiment, the processing engine 202 may be configured to store the received plurality of parameters in the memory 204.

In order to generate the plurality of clusters, the clustering module 208 may be configured to determine a count number of clusters that need to be generated. In an embodiment, the count of the plurality of clusters may be based on may be based on a maximum range of transmission of the plurality of wireless transmitters 104a to 104f and a recommended minimum distance between the one or more sensors located in the region. The number of the plurality of clusters may be further based on a minimum range of transmission of the new wireless transmitter 108. A person of ordinary skill in the art will appreciate that a difference in the maximum range of transmission of the plurality of wireless transmitters 104a to 104f is less than a predefined threshold. The predefined threshold may be stored in the memory 204.

In an embodiment, the clustering module 208 may be configured to query the signal strength table 218 to retrieve the one or more parameters relating to a maximum range of transmission of the plurality of wireless transmitters 104a to 104f, a recommended minimum distance between the one or more sensors located in the indoor space 102, and the minimum range of transmission of the new wireless transmitter 108. The clustering module 208 may be further configured to determine the number of clusters to be generated (denoted by "K"), based on the equation (2):

$$K = \max\left(\text{CONSTANT}, \frac{\text{Maximum Range of Transmitters} + \text{Minimum Range of new transmitter}}{\text{Minimum Separation between Sensors}}\right) \tag{2}$$

where, "CONSTANT" denotes an experimentally determined value of the minimum number of clusters required for controlling a transmit range of the new wireless transmitters 108. In an embodiment, the "CONSTANT" may be stored in the memory 204 and may be configured by a user.

In accordance with the equation (2), when the value of CONSTANT is "4", the maximum range of a wireless transmitter of the plurality of wireless transmitters is "25 meters", the minimum separation between the one or more sensors 106 is "5 meters", and the minimum range of transmission of the new wireless transmitter 108 is "5 meters", the determined number of clusters "K" is "6".

Subsequent to determination of the number of clusters, the clustering module 208 may be configured to generate the plurality of clusters. The determination of the plurality of clusters may be based on K-means clustering algorithm (or K-means++ clustering algorithm). The generation may include determination of a plurality of centroids of the Signal-Strength-Matrix. In an embodiment, the plurality of centroids may be determined based on a random selection of the RSSI values from the data structure. In an embodiment, a centroid of the plurality of centroids corresponds to a signal strength value, the distance of which from every other value in the cluster is minimum. Further, the distance signifies a measure of the difference between two signal strength values. In an embodiment, the determination of the distance may be based on, but is not limited to, a Euclidean distance, a Square Euclidean distance, a Manhattan distance, or a Hamming distance. Further, for each value "x" in the Signal-Strength-Matrix, the clustering module may be configured to compute a value "D(x)", based on the distance between "x" and the nearest centroid (denoted by a value "centroid") that has already been chosen using the equation (3):

$$D(x) = |x - \text{centroid}|^2 \quad \ldots (3)$$

The clustering module 208 may be further configured to select a new centroid from the remaining values in the Signal-Strength-Matrix, where a point "x" is chosen with probability proportional to "D(x)2", by computing a ration denoted in the equation (4) for each value "x" in the Signal-Strength-Matrix:

$$\text{Ratio} = \frac{D(x)^2}{\sum_{All\, y \neq x} D(y)^2} \quad (4)$$

Based on the equation (4), the clustering module 208 may further select a value "x" for which the ratio is largest as the new centroid. The clustering module 208 may be further configured to repeat the aforementioned steps until "K" centroids have been determined as the plurality of centroids. Further, the clustering module 208 may be configured to calculate the distance to all the determined "K" centroids (centroid 1, centroid 2, . . . centroid K), for every value "x" in the Signal-Strength-Matrix, in accordance with equation (5):

$$\text{Distance, } D_i(x) = |x - \text{centroid } i|2 \quad \ldots (5)$$

The clustering module 208 may be further configured to assign every value in the Signal-Strength-Matrix to one of K clusters, such that a value belongs to a cluster "i" (i=1 to K), if the value's distance from centroid "i" is the least. The clustering module 208 may be further configured to recalculate the centroids of all "K" clusters to get "K" new centroids. The clustering module 208 may be configured to perform the aforementioned operations until there is no significant change in the following metric denoted by equation (6):

$$J = \sum_{i=1}^{K} \sum_{All\, x\, in\, cluster\, i} |x - \text{centroid}\, i|^2 \quad (6)$$

where, "x" is a value from the Signal-Strength-Matrix and "centroid i" is the centroid of cluster "i". The clustering module 208 may be configured to communicate the generated clusters to the processing engine 202. Notwithstanding, the disclosure may not be so limited, and the generation of the plurality of clusters may be based on one or more other clustering algorithms known in the art, without limiting the scope of the disclosure.

In an embodiment, the processing engine 202 may be configured to determine one or more positions in the indoor space 102, where the new wireless transmitter 108 may be placed. Further, the processing engine 202 may be configured to instruct the transmit range estimation module 216 to determine a maximum range of transmission of the new wireless transmitter 108 at each of the one or more positions. The transmit range estimation module 216 may be configured to consider a largest cluster from the generated plurality of clusters along with the Signal-Strength-Matrix, to generate a new matrix New-Transmitter-Positions-Matrix, in accordance with equation (7):

New-Transmitter-Positions-Matrix=Signal-Strength-Matrix (7)

For each value in the largest cluster, the transmit range estimation module 216 may be further configured to set the value in the New-Transmitter-Positions-Matrix to "1". The transmit range estimation module 216 may be configured to set all the remaining values in the New-Transmitter-Positions-Matrix to "0". The values "0" correspond to the positions where the wireless transmitters of the plurality of wireless transmitters are placed. The values "0" further correspond to the vicinity where interference may occur, if the new wireless transmitter 108 is placed. The aforementioned operations may be performed by the binary image generation module 214.

In an embodiment, the processing engine 202 may be configured to determine one or more positions for placing the new wireless transmitter 108 within a cluster from the plurality of clusters. The processing engine 202 may be further configured to determine a maximum range of transmission at each of the one or more positions. With respect to the received request for placing the new wireless transmitter 108, the transmit range estimation module 216 may be configured to control the transmit range of the new wireless transmitter 108 (if placed at the determined one or more positions).

In an embodiment, the transmit range estimation module 216 may be configured to retrieve a predefined value, such as a range increment value, from the memory 204. In an embodiment, the range increment value may be an empirically determined constant. In another embodiment, the range increment value may be user configurable.

In an embodiment, the controlling of the range of transmission of the new wireless transmitter 108, at each of the one or more positions, is based on incrementing (or decrementing) the range of transmission of the wireless transmitter by the range increment value. For example, at an exemplary position in the indoor space 102, the transmit range estimation module 216 may be configured to determine whether the value in the New-Transmitter-Positions-Matrix is "0". In scenarios, when the value in the New-Transmitter-Positions-Matrix is "0", the transmit range estimation module 216 iterates to another value in the New-Transmitter-Positions-Matrix. This is performed by passing the Signal-Strength-Matrix and Minimum Transmit Range to the clustering module 208. The aforementioned operations are performed because placing the new wireless transmitter at the aforementioned position will lead to interference with an already placed wireless transmitter.

In scenarios, when the value in the New-Transmitter-Positions-Matrix is "1", the transmit range estimation module 216 increments the minimum range of transmission of the new wireless transmitter 108 by the range increment value. Furthermore, the transmit range estimation module 216 may be further configured to iteratively increment the range of the new wireless transmitter 108 till the value in the New-Transmitter-Positions-Matrix is not "0". As a result, the incrementally determined range may correspond to the maximum range of transmission of the new wireless transmitter 108. Consequently, the determined maximum range of transmission now corresponds to a value for which the interference between the new wireless transmitter 108 and a wireless transmitter from the plurality of wireless transmitters, is less than a predefined interference threshold. Furthermore, the each of the determined maximum ranges corresponding to the one or more positions are greater than or equal to the minimum range of transmission of the new wireless transmitter 108. A person of ordinary skill in the art will appreciate that the determined each of the one or more positions are different from the preferred position, when the determined maximum range of transmission the new wireless transmitter 108 at the preferred position is less than the minimum range of transmission the new wireless transmitter 108.

In an embodiment, the aforementioned predefined interference threshold may corresponds to an empirically determined value that may be stored in the memory 204. In another embodiment, the aforementioned predefined interference threshold may be a user configurable value. A person of ordinary skill in the art will appreciate that the aforementioned incrementing is performed only such that based on the incremented range of transmission the interference between the wireless transmitter and a wireless transmitter from the plurality of wireless transmitters is less than a predefined interference threshold.

In an embodiment, the processing engine 202 may be configured to select a position from the determined one or more positions. The selection may be performed such that the maximum range of transmission corresponding to the selected position is higher than the determined maximum range of transmission corresponding to remaining positions from the one or more positions. In another embodiment, the aforementioned selection of the position may be performed by a user associated with the range determination device 110. In yet another embodiment, the aforementioned selection of the position may be performed based on one or more machine learning algorithm known in the art. In order to reduce the processing complexity, such machine learning algorithms, may further be applied on the selection performed by the user, so that the range determination device 110 may directly determine a most favorable position and maximum range of transmission for the new wireless transmitter. In an embodiment, the processing engine 202 may be configured to store the determined one or more positions and the selected position in the new transmitter position table 220.

In another embodiment, the processing engine 202 may be configured to transmit the determined one or more positions along with the corresponding maximum range, to the new wireless transmitter 108, via the transceiver 212. The new wireless transmitter 108 may select a position responsive to the received one or more positions. In another embodiment, the aforementioned selection of the position may be performed by a user associated with either the new wireless transmitter 108. The selected position may be communicated to the range determination device 110, which may then store it in the new transmitter position table 220. The stored position of the new wireless transmitter 108 may then be retrieved by a user, from the database 210, for further processing.

FIG. 3 depicts the outcome of processing the retrieved RSSI values corresponding to the plurality of wireless transmitters 104a to 104b, measured by the one or more sensors 106, by the range determination device 110. The elements of FIG. 3 have been explained in conjunction with the elements of FIGS. 1 and 2.

With reference to FIG. 3, there are shown exemplary versions 300a, and 300b of the indoor space 102, for controlling a transmit range of a wireless transmitter to be placed among a plurality of wireless transmitters. The exemplary version 300a depicts the outcome from the clustering module 208. The exemplary version 300a includes the plurality of clusters that are generated based on the processing performed and explained in FIG. 2, by the clustering module 208 using K-means (or in some embodiments, K-means++ algorithm). The clusters in the exemplary version 300a are depicted by the clusters 302, 304, 306, and 308.

The clusters 302 to 306 represent clusters for which the corresponding values in the New-Transmitter-Positions-Matrix is "0". Similarly, the cluster 308 represents the cluster for which the corresponding values in the New-Transmitter-Positions-Matrix is "1". In other words, the new wireless transmitter 108 may be placed in the cluster 308 without causing interference to the plurality of wireless transmitters 104a to 104f. However, if placed in the clusters 302 to 306, the transmission by the new wireless transmitter 108 may interfere with that of a wireless transmitter of the plurality of wireless transmitters 104a to 104f. The determination of the count and process of generation of the plurality of clusters has been explained in detail in the FIGS. 1 and 2.

The exemplary version 300b depicts the indoor space 102 translated into a Cartesian space where each point in the indoor space 102 has an associated Cartesian coordinate. Furthermore, the New-Transmitter-Positions-Matrix is superimposed on the depicted version of the indoor space 102. The values in the New-Transmitter-Positions-Matrix corresponding to the position of the plurality of wireless transmitters 104a to 104f are also depicted. The coordinates may range from "(0m, 0m)" to "(20m, 15m)".

In an exemplary scenario, the range determination device 110 may receive a request for placing the new wireless device 108 in the indoor space 102. The minimum range of transmission of the new wireless device 108 may be "2 meters". Further, the preferred position may be have the Cartesian coordinates 310 that may have the value "(17m, 14m)". As can be seen from the figure, the value at the Cartesian coordinates 310 is "0". This is indicative of the presence of a previously placed wireless transmitter, such as the wireless transmitter 104d, or a transmit range of the wireless transmitter 104d. Consequently, the new wireless transmitter 108 cannot be placed at the aforesaid position. As alternate positions, the range determination device 110 may determine the positions in the vicinity of the preferred location, where wireless transmitters 104d or transmit range thereof, may not be present. Further, the range determination device 110 may further consider that the interference between the new wireless transmitter 108 and the wireless transmitter 104d is minimized at such positions. The examples of such one or more locations may have the coordinates "(14m, 13m)", "(14m, 14m)", and/or "(14m, 15m)". The new wireless transmitter 108 may select one of the aforesaid positions. The selected positions may be stored in the new transmitter position table 220. The range determination device 110 may further determine maximum range of transmission for each of the aforementioned positions. Based on the determination of the maximum ranges, the range determination device 110 may select the position for which the range of transmission is maximum.

In another exemplary scenario, the preferred position of the new wireless transmitter 108 may have the Cartesian coordinates 312 that may have the value "(15m, 10m)". In such a scenario, the range determination device 110 may increment the minimum range of transmission of the new wireless transmitter 108 ("2 meters") by the range increment value that may be stored in the range increment lookup table 222. The value of the range increment value may be "2 meters". The incremented range of the new wireless transmitter 108 may be "4 meters". The range determination device 110 may further increment the range of the new wireless transmitter 108 by the range increment value. However, by doing so, the range of the new wireless transmitter 108 may become "6 meters" and the transmission may interfere with that of the wireless transmitter 104d and 104e. Therefore, the range determination device 110 may determine the maximum range of the new wireless transmitter 108 at the position "(15m, 10m)" as "4 meters". The position and the determined maximum range of transmission may be stored in the new wireless transmitter position table 220.

FIG. 4 is a flow diagram of a detailed exemplary process for controlling a transmit range of a wireless transmitter to be placed among a plurality of wireless transmitters, in accordance with some embodiments of the present disclosure. With reference to FIG. 4, there is shown a flow chart 400. The flow chart 400 is described in conjunction with FIGS. 1 to 3. The process starts at step 402 and proceeds to step 404.

A step 404, Received Signal Strength Indicator (RSSI) values measured by one or more sensors 106, corresponding to the plurality of wireless transmitters 104a to 104f distributed in the indoor space 102, may be retrieved by the signal strength module 206. At step 406, a plurality of parameters associated with the wireless transmitter (new wireless transmitter 108) may be received by the range determination device 110. The received plurality of parameters may include a minimum range of transmission of the wireless transmitter and a preferred position in the region where the wireless transmitter is to be placed.

At step 408, a plurality of clusters 302, 304, 306, and 308 may be generated based on the retrieved RSSI values, by the clustering module 208. The generation of the plurality of clusters 302, 304, 306, and 308 may be further based on a maximum range of transmission of the plurality of wireless transmitters, a recommended minimum distance between the one or more sensors located in the region, and the minimum range of transmission of the wireless transmitter.

At step 410, one or more positions for placing the new wireless transmitter 108 within a cluster from the generated one or more clusters may be determined, along with maximum range of transmission at each of the one or more positions. The maximum range is determined based on a control of a range of transmission of the wireless transmitter. At step 412, a position from the determined one or more positions may be selected such that the maximum range of transmission at the selected position is the greatest. The selected positions may be stored in the new transmitter position table 220. The control passes to end step 414.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11 a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11 a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (B SD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for controlling a transmit range of a wireless transmitter to be placed among a plurality of wireless transmitters. Based on such a control, the user may be able to allocate the frequencies for transmission to the plurality of wireless transmitters so that no interference of frequencies takes place if and when a new wireless transmitter is added to the indoor space. Furthermore, the present invention enables the user to optimize the bandwidth for frequency utilization. This is because when the maximum range of transmission of a new wireless transmitter when placed in the vicinity of the plurality of wireless transmitters is known, the user may be able to determine a distance at which to place the new wireless transmitter while optimizing the placement of wireless transmitters to minimize the interference. Additionally, the present system does not rely on knowledge regarding exact power at which the plurality of wireless transmitters transmit the signals. Also, the present solution does not require a priori knowledge of the number of wireless transmitters.

The specification has described system and method for controlling a transmit range of a wireless transmitter to be placed among a plurality of wireless transmitters. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of controlling a transmit range of a wireless transmitter to be placed among a plurality of wireless transmitters, the method comprising:
   retrieving, by a range determining device, Received Signal Strength Indicator (RSSI) values measured by one or more sensors, corresponding to the plurality of wireless transmitters spatially distributed in a region in which the sensors are located;
   receiving, by the range determining device, at least a plurality of parameters associated with the wireless transmitter to be placed within the region, wherein the plurality of parameters comprise at least a minimum range of transmission of the wireless transmitter and a preferred position in the region where the wireless transmitter is to be placed;
   generating, by the range determining device, a plurality of clusters based on at least the retrieved RSSI values and the received minimum range of transmission of the wireless transmitter; and
   determining, by the range determining device, one or more positions for placing the wireless transmitter within a cluster from the plurality of clusters, and a maximum range of transmission at each of the one or more positions, wherein the maximum range is determined based on a control of a range of transmission of the wireless transmitter.

2. The method of claim 1, wherein the generation of the plurality of clusters comprises:
   creating a data structure having RSSI values measured by each of the one or more sensors, wherein each element of the data structure corresponds to a position of a sensor, from the one or more sensors, in the region; and
   determining a plurality of centroids of the data structure having RSSI values, based on a random selection of RSSI values from the data structure, wherein each centroid in the plurality of centroids corresponds to a cluster from the plurality of clusters.

3. The method of claim 1, wherein a count of clusters in the plurality of clusters is based on a maximum range of transmission of the plurality of wireless transmitters, a recommended minimum distance between the one or more sensors located in the region, and the minimum range of transmission of the wireless transmitter.

4. The method of claim 3, wherein a difference in the maximum range of transmission of the plurality of wireless transmitters is less than a predefined threshold.

5. The method of claim 1, wherein the controlling of the range of transmission of the wireless transmitter, at each of the one or more positions, is based on incrementing the minimum range of transmission of the wireless transmitter by a predefined value.

6. The method of claim 5, wherein the incrementing is performed until the interference between the wireless transmitter and a wireless transmitter from the plurality of wireless transmitters is less than a predefined interference threshold, such that based on the incremented range of transmission the interference between the wireless transmitter and a wireless transmitter from the plurality of wireless transmitters is less than a predefined interference threshold.

7. The method of claim 1, further comprising selecting a position from the determined one or more positions for which the maximum range of transmission is higher than the determined maximum range of transmission corresponding to remaining positions from the one or more positions.

8. The method of claim 1, wherein the determined maximum range of transmission of the wireless transmitter is greater than or equal to the minimum range of transmission of the wireless transmitter.

9. The method of claim 1, wherein the determined one or more positions of the wireless transmitter are different from the preferred position when the determined maximum range of transmission the wireless transmitter at the preferred position is less than the minimum range of transmission the wireless transmitter.

10. The method of claim 1, wherein the determined one or more positions of the wireless transmitter are stored in a transmitter table database.

11. A device comprising:
a processor; and
a memory communicatively coupled to the processor, wherein the memory stores the processor-executable instructions, which, on execution, causes the processor to:
retrieve Received Signal Strength Indicator (RSSI) values measured by one or more sensors, corresponding to the plurality of wireless transmitters spatially distributed in a region in which the sensors are located;

receive at least a plurality of parameters associated with the wireless transmitter to be placed within the region, wherein the plurality of parameters comprise at least a minimum range of transmission of the wireless transmitter and a preferred position in the region where the wireless transmitter is to be placed;

generate a plurality of clusters based on at least the retrieved RSSI values and the received minimum range of transmission of the wireless transmitter; and determine one or more positions for placing the wireless transmitter within a cluster from the plurality of clusters, and a maximum range of transmission at each of the one or more positions, wherein the maximum range is determined based on a control of a range of transmission of the wireless transmitter.

12. The device of claim 11, wherein the generation of the plurality of clusters comprises:

creating a data structure having RSSI values measured by each of the one or more sensors, wherein each element of the data structure corresponds to a position of a sensor, from the one or more sensors, in the region; and determining a plurality of centroids of the data structure having RSSI values, based on a random selection of RSSI values from the data structure, wherein each centroid in the plurality of centroids corresponds to a cluster from the plurality of clusters.

13. The device of claim 11, wherein a count of clusters in the plurality of clusters is based on a maximum range of transmission of the plurality of wireless transmitters, a recommended minimum distance between the one or more sensors located in the region, and the minimum range of transmission of the wireless transmitter.

14. The device of claim 13, wherein a difference in the maximum range of transmission of the plurality of wireless transmitters is less than a predefined threshold.

15. The device of claim 11, wherein the control of the range of transmission of the wireless transmitter, at each of the one or more positions, is based on incrementing the minimum range of transmission of the wireless transmitter by a predefined value.

16. The device of claim 15, wherein the incrementing is performed until the interference between the wireless transmitter and a wireless transmitter from the plurality of wireless transmitters is less than a predefined interference threshold.

17. The device of claim 11, wherein the processor is further configured to select a position from the determined one or more positions for which the maximum range of transmission is higher than the determined maximum range of transmission corresponding to remaining positions from the one or more positions.

18. The device of claim 11, wherein the determined maximum range of transmission of the wireless transmitter is greater than or equal to the minimum range of transmission the wireless transmitter.

19. The device of claim 11, wherein the determined one or more positions of the wireless transmitter are different from the preferred position when the determined maximum range of transmission the wireless transmitter at the preferred position is less than the minimum range of transmission the wireless transmitter.

20. A non-transitory computer-readable medium storing instructions for controlling a transmit range of a wireless transmitter to be placed among a plurality of wireless transmitters, wherein upon execution of the instructions by one or more processors, the processors perform operations comprising:

retrieving Received Signal Strength Indicator (RSSI) values measured by one or more sensors, corresponding to the plurality of wireless transmitters spatially distributed in a region in which the sensors are located;

receiving at least a plurality of parameters associated with the wireless transmitter to be placed within the region, wherein the plurality of parameters comprise at least a minimum range of transmission of the wireless transmitter and a preferred position in the region where the wireless transmitter is to be placed;

generating a plurality of clusters based on at least the retrieved RSSI values and the received minimum range of transmission of the wireless transmitter; and determining one or more positions for placing the wireless transmitter within a cluster from the plurality of clusters, and a maximum range of transmission at each of the one or more positions, wherein the maximum range is determined based on a control of a range of transmission of the wireless transmitter.

* * * * *